B. J. DIPLOCK.
ROAD VEHICLE.
APPLICATION FILED FEB. 23, 1910.

1,014,132.

Patented Jan. 9, 1912.
5 SHEETS—SHEET 1.

Witnesses
M. E. Burrell
E. B. Franzoni.

Inventor
B. J. Diplock
By his attorneys,
Baldwin Wright

B. J. DIPLOCK.
ROAD VEHICLE.
APPLICATION FILED FEB. 23, 1910.

1,014,132.

Patented Jan. 9, 1912.
5 SHEETS—SHEET 2.

Witnesses
B. J. Diplock, Inventor

B. J. DIPLOCK.
ROAD VEHICLE.
APPLICATION FILED FEB. 23, 1910.

1,014,132.

Patented Jan. 9, 1912.

5 SHEETS—SHEET 3.

Witnesses
M. E. Burrell
E. B. Franzoni

Inventor
B. J. Diplock
By his Attorneys
Baldwin & Wight

B. J. DIPLOCK.
ROAD VEHICLE.
APPLICATION FILED FEB. 23, 1910.
1,014,132.
Patented Jan. 9, 1912.
5 SHEETS—SHEET 4.
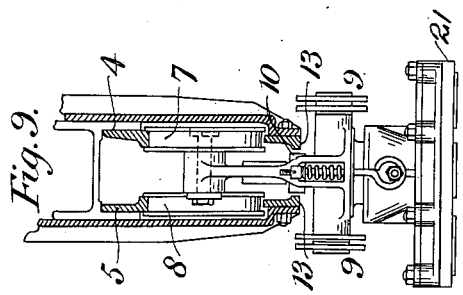
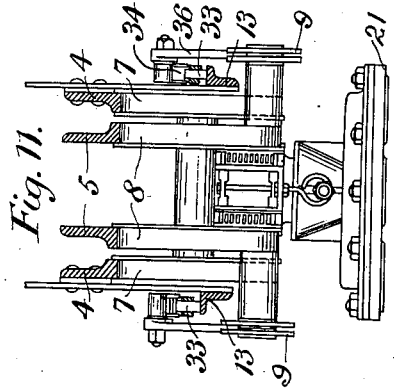
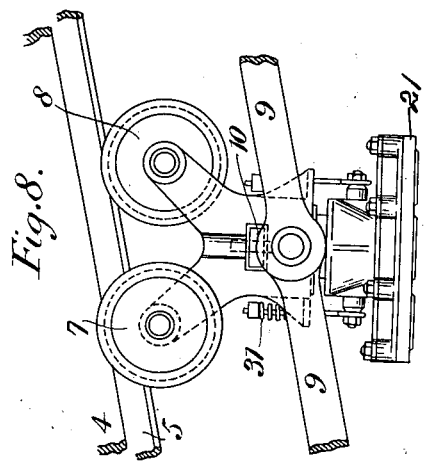
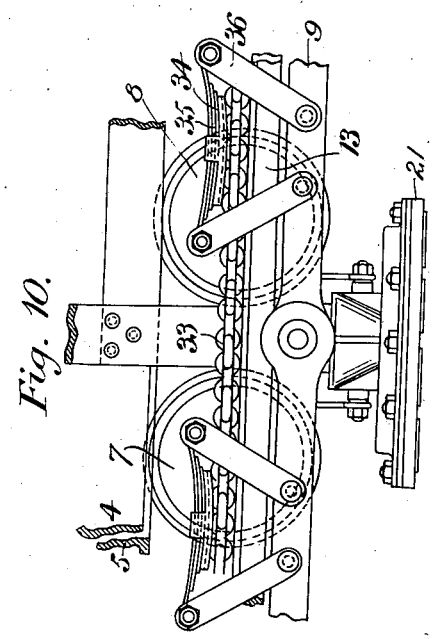
Witnesses
M. E. Burrell
E. B. Franzoni
Inventor
B. J. Diplock
By his attorneys
Baldwin Wight B. J. DIPLOCK.
ROAD VEHICLE.
APPLICATION FILED FEB. 23, 1910.
1,014,132.
Patented Jan. 9, 1912.
5 SHEETS—SHEET 5.
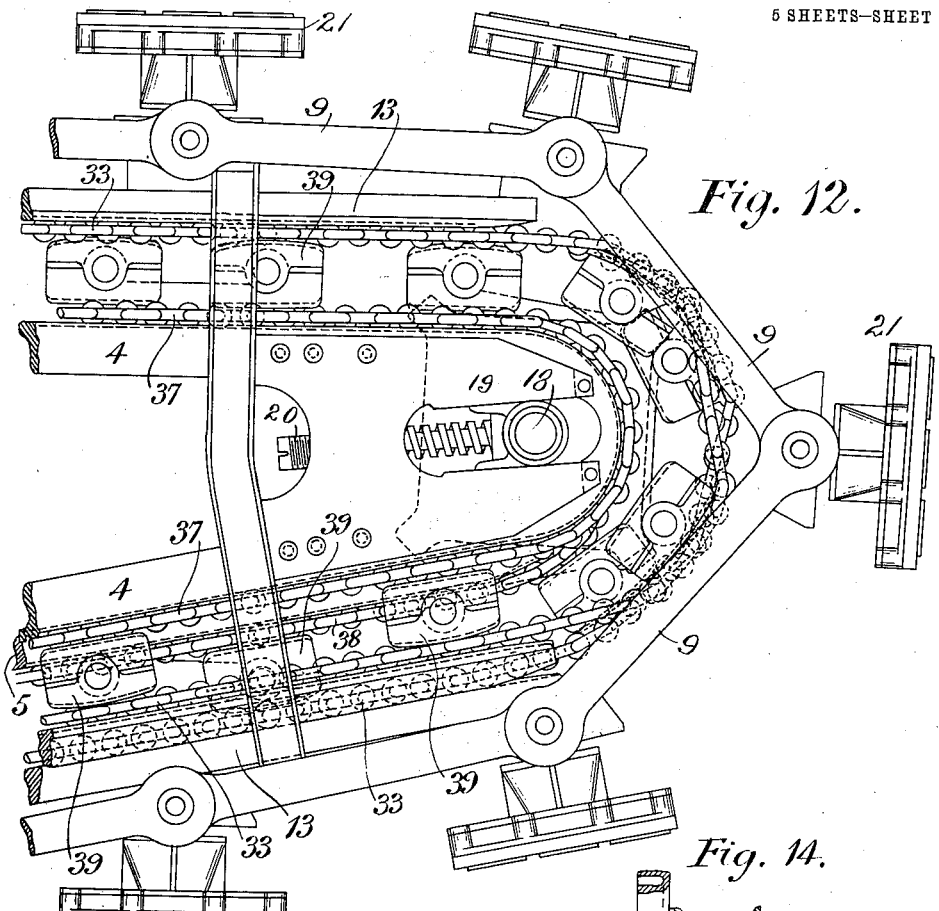
Fig. 12.
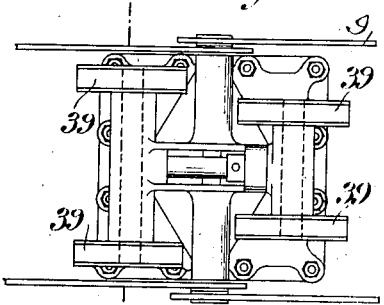
Fig. 13.
Fig. 14.
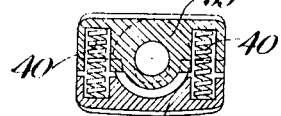
Fig. 15.
Witnesses
M. E. Burrell
C. B. Franzoni
Inventor
B. J. Diplock
By his Attorneys
Baldwin Wight

UNITED STATES PATENT OFFICE.

BRAMAH JOSEPH DIPLOCK, OF WHEATSHEAF WHARF, FULHAM, ENGLAND.

ROAD-VEHICLE.

1,014,132. Specification of Letters Patent. Patented Jan. 9, 1912.

Application filed February 23, 1910. Serial No. 545,532.

*To all whom it may concern:*

Be it known that I, BRAMAH JOSEPH DIPLOCK, a subject of the King of Great Britain, residing at Wheatsheaf Wharf, Crabtree Lane, Fulham, in the county of Middlesex, England, have invented new and useful Improvements in Road-Vehicles, of which the following is a specification.

This invention relates to the class of vehicles in which the ordinary road wheels are replaced by feet on an endless series of carriers.

According to this invention the carriers are guided in a vertical plane in such a manner that they move parallel to themselves at the times when the feet carried by them are nearing the ground line and preferably also when they are rising from it.

The invention is applicable both to self propelled and to other vehicles.

Figure 1:
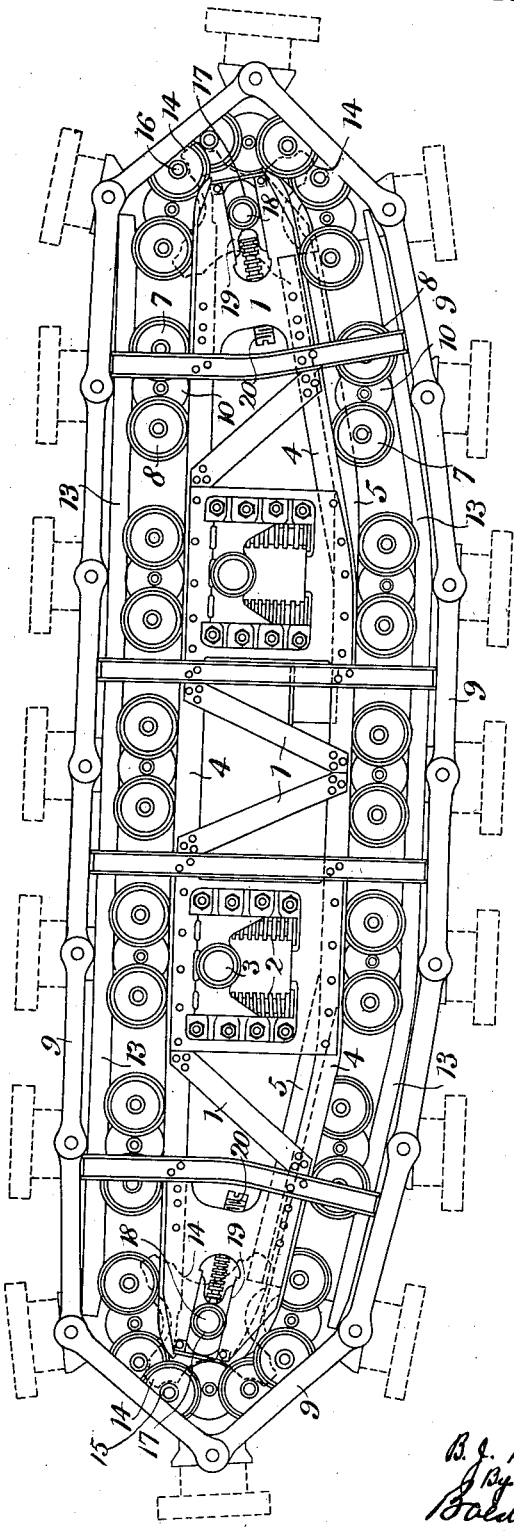
Figure 2:
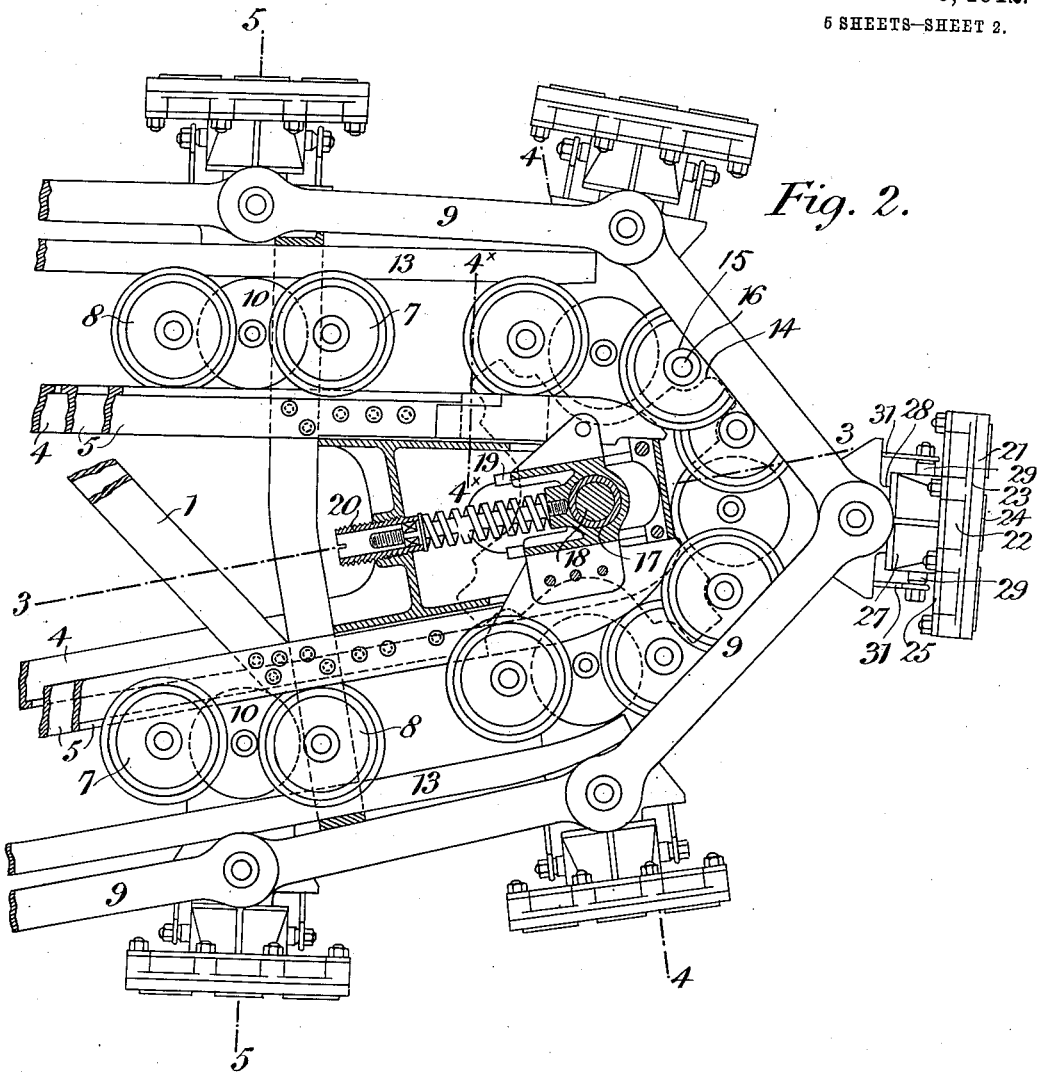
Figure 3:
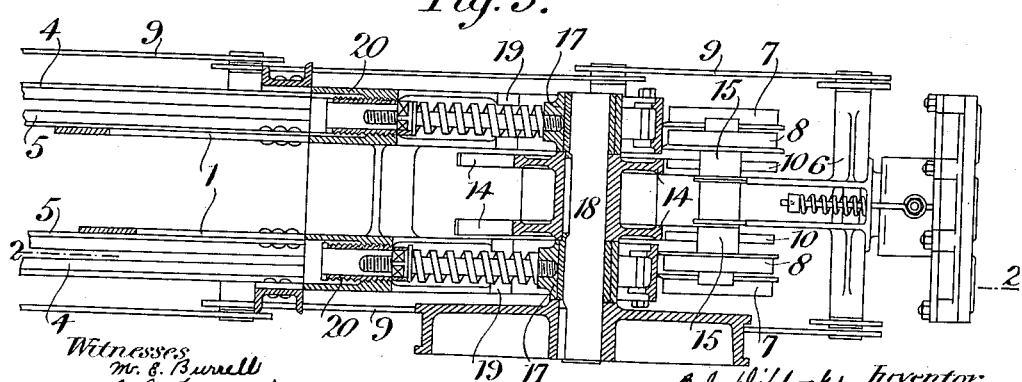
Figure 4:
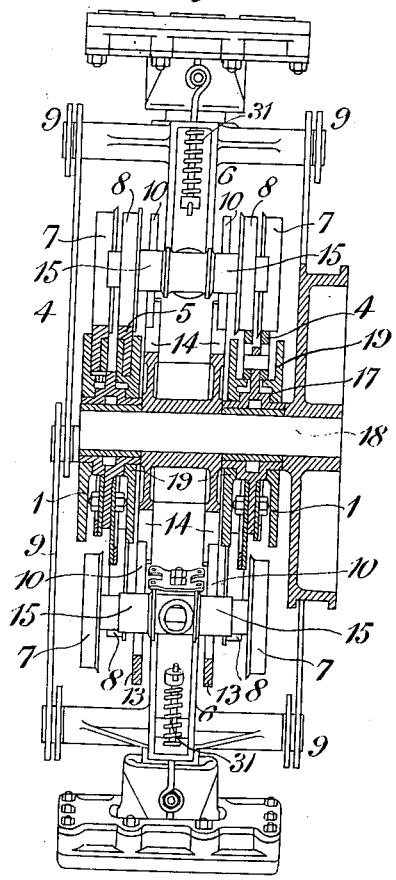
Figure 5:
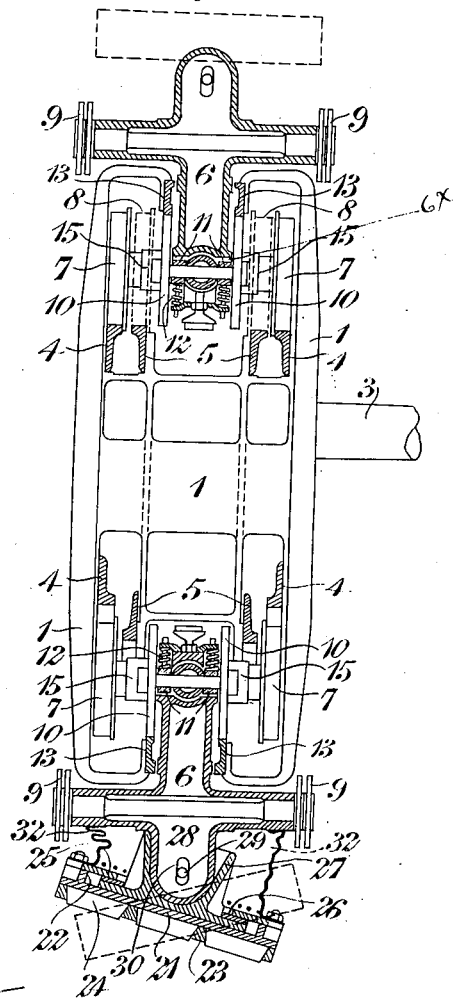
Figure 6:
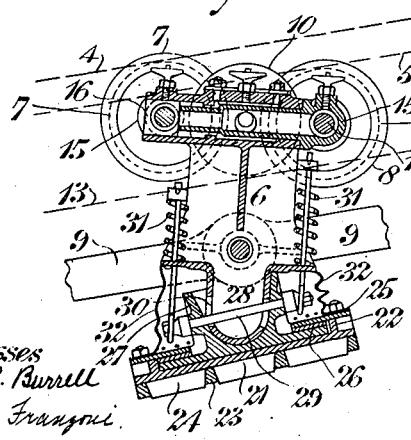
Figure 7:
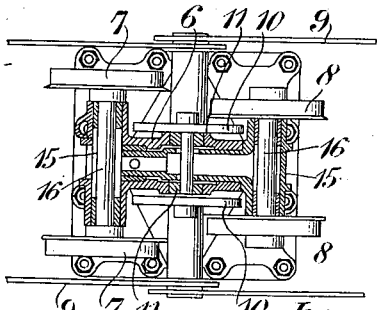

Figures 1 to 7 show one method of carrying out the invention. Fig. 1 is a side elevation of a chain of feet on one side of the vehicle together with the mechanism for controlling them. Fig. 2 is a side elevation (partly in section on the line 2—2 Fig. 3) of one end of this chain to a larger scale. Figs. 3, 4 and 5 are sections on the lines 3—3, 4—4 (and a small portion on the line 4ˣ—4ˣ) and 5—5 Fig. 2. Fig. 6 is a longitudinal vertical section of one of the carriers with its foot, and Fig. 7 is a section on the line 7—7 Fig. 6. Figs. 8 and 9 show a modification. Fig. 8 being a part side elevation and Fig. 9 a part end elevation. Figs. 10 and 11 show another modification. Fig. 10 being a part side elevation and Fig. 11 a part end elevation. Figs. 12 to 15 show another modification. Fig. 12 being a side elevation of one end of the chain of feet, Fig. 13 a plan of one of the foot carriers with its two pair of sledges, Fig. 14 a part section on the line 14—14 Fig. 13, and Fig. 15 a section of one of the sledges to a somewhat larger scale.

In Figs. 1 to 7, 1 is a frame supporting springs 2 carrying axles 3 fixed to the body of the vehicle which is not shown. A single axle 3 may be employed in place of two and the frame 1 may indeed be connected to the body in any ordinary way. 4 and 5 are two sets of rails fixed to the frame 1 and which constitute guides for the endless series of foot carriers. 6 are carriers to which the feet are pivoted as hereinafter described. The carriers 6 are each provided with two pairs of wheels 7 and 8 which run respectively on the guides or rails 4 and 5. At the points corresponding to the places where the feet are just above the ground the rails 4 and 5 are at different levels as is clearly shown at Figs. 1 and 5, so that the carriers are kept horizontal in spite of the fact that the rails are inclined. The lower members of the guides or rails incline downward and backward at their front ends and their active surfaces are the same distance apart measured horizontally throughout the greater part of their inclined lengths. The guides act on the carriers at two points in their length the line joining the two ends being at a constant angle to the vertical throughout the entire length of the inclined guides. The carriers 6 are connected together by links 9 forming endless chains. 10 are a third pair of wheels on each of the carriers 6, their axle runs in bearings 11 free to slide in slots 6ˣ in the frame of the carrier and acted on by the springs 12 (Fig. 5) in such manner as to press the wheels 10 against the rails 13 fixed to the frame 1 and thus keep the carrier steady during its movement. The bearings 11 thus constitute slides on the carriers which are free to move transversely to them but are prevented by the sides of the slots 6ˣ from moving longitudinally to them. The rails 13 form guides for these slides. 14 are sprocket wheels at the two ends of the frame 1, their teeth pass between adjacent carriers 6 and engage with the tubes 15 which contain the axles 16 of the wheels 7 and 8. The bearings 17 of the axles 18 of the sprocket wheels 14 are free to move in guides 19 in the frame 1 and are acted on by screws 20 so that any wear in the chains of links 9 can be taken up. The rails 4 and 5 are made telescopic to allow of this movement as is shown at Fig. 2 and in the section on the line 4ˣ—4ˣ. In the case of self propelled vehicles one of the axles is driven. Each foot consists of a plate 21 having a flange 22 projecting from its upper surface and having fixed to its under side a cellular grating 23 containing blocks 24 of india rubber, wood or like material. 25 is a plate fixed to the flange 22 and forming a guide for the flange 26 of a cup 27 which works on a bulb 28 fixed to the frame of the carrier. A very small longitudinal play but a considerable transverse play is allowed to the flange 26. 29 is a pivot pin working in slots 30 in the bulb 28 and the movement of its ends is controlled by springs 31. 32 is a loose bag of leather or the like inclosing the working parts of the foot.

In the modification shown at Figs. 8 and 9 only two wheels 7 and 8 are employed on each carrier. These wheels are doubly flanged so as to embrace the rails 4 and 5. There is also only one wheel 10 on each carrier which is placed horizontally instead of vertically and runs between the rails 13 fixed to the frame 1. These rails 13 also serve to limit the movement of the wheels 7 and 8 away from the rails 4 and 5. In other respects the arrangement is similar to that shown at Figs. 1 to 7.

In the modification shown at Figs. 10 and 11, the wheels 10 pivoted to the carriers are replaced by endless chains 33 of balls or rollers running on the rails 13. 34 are blocks bearing on the chains 33 and connected to the carriers by springs 35 and links 36. The blocks 34 therefore constitute slides on the carriers which are free to move transversely to them but are prevented by the links 36 from moving longitudinally to them. The springs 35 serve the same purpose as the springs 12 namely that of keeping the wheels 7 and 8 in contact with the rails 4 and 5.

The arrangement shown at Figs. 12 to 15 is a further modification in the same direction, the wheels 7 and 8 (shown in Figs. 8 and 9) being replaced by endless chains 37 and 38 of balls or rollers. The chains 33 are retained but the blocks 34, springs 35 and links 36 are replaced by sledges made in two parts 39, 39× forced apart by the springs 40. The upper part 39 (Fig. 15) forms a portion of the foot carrier and the part 39× is the slide upon it. The working of this arrangement is exactly the same as that of the others, the rails 4 and 5 acting on the foot carriers at the ends of their axles through the intervention of the chains 37 and 38 and the sledges 39 in place of through the rollers 7 and 8.

What I claim is:—

1. The combination of an endless series of foot carriers, feet on the carriers, and two guides acting on the carriers at two points in their length such guides being parallel to each other above the places where the feet are on the ground but being inclined at an angle to each other where the feet are nearing the ground line.

2. The combination of an endless series of foot carriers, feet on the carriers, two guides acting on the carriers at two points in their length such guides being parallel to each other above the places where the feet are on the ground but being inclined at an angle to each other where the feet are nearing the ground line, and anti-friction devices interposed between the guides and the carriers.

3. The combination of an endless series of foot carriers, feet on the carriers, two wheels on the carriers one in advance of and to one side of the other and two rails on which the said wheels run, such rails being parallel to each other above the places where the feet are on the ground but being inclined at an angle to each other where the feet are nearing the ground line.

4. The combination of an endless series of foot carriers, feet on the carriers, two wheels on the carriers one in advance of and to one side of the other, two rails on one side of the carriers on which the said wheels run, such rails being parallel to each other above the places where the feet are on the ground but being inclined at an angle to each other where the feet are nearing the ground line, a third rail on the other side of the carriers, a part on each carrier and movable relatively to it, and a spring tending to press this part toward the third rail.

5. The combination of a foot carrier, a bulb on the underside of the carrier, a foot having a cup on its upper side to receive the bulb and a pin fixed to the foot and passing through a slot in the bulb.

6. The combination of an endless series of foot carriers, feet on the carriers, guides for the carriers, slides on the carriers free to move transversely to them, but prevented from moving longitudinally to the carriers, guides for the slides and springs interposed between the carriers and the slides and tending to press them against their respective guides.

7. The combination of an endless series of foot carriers, feet on the carriers, and two guides inclining downward and backward at their front ends and acting on the carriers at two points in their length, the line joining these two points being at a constant angle to the vertical throughout the greater part of the inclined length of the guides.

8. The combination of an endless series of foot carriers, feet pivoted to the carriers, links connecting the carriers, and two guides inclining downward and backward at their front ends and acting on the carriers at two points in their length, the line joining these two points being at a constant angle to the vertical throughout the greater part of the inclined length of the guides.

BRAMAH JOSEPH DIPLOCK.

Witnesses:
PERCIVAL L. OLDHAM,
ROBERT S. B. CHAMBERS.